(12) United States Patent
Ueda (10) Patent No.: US 10,435,019 B2
(45) Date of Patent: Oct. 8, 2019

(54) COURSE PREDICTION METHOD AND COURSE PREDICTION DEVICE (71) Applicant: Nissan Motor Co., Ltd., Yokohama-shi, Kanagawa (JP)

(72) Inventor: Hirotoshi Ueda, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/087,268

(22) PCT Filed: Mar. 24, 2016

(86) PCT No.: PCT/JP2016/059396
§ 371 (c)(1),
(2) Date: Sep. 21, 2018

(87) PCT Pub. No.: WO2017/163366
PCT Pub. Date: Sep. 28, 2017

(65) Prior Publication Data
US 2019/0100199 A1  Apr. 4, 2019

(51) Int. Cl.
*B60W 30/095* (2012.01)
*B60W 30/09* (2012.01)
(Continued)

(52) U.S. Cl.
CPC ........ *B60W 30/0956* (2013.01); *B60W 30/09* (2013.01); *B60W 30/0953* (2013.01); *B60W 30/165* (2013.01); *B60W 40/02* (2013.01); *G05D 1/0212* (2013.01); *B60W 2550/10* (2013.01); *B60W 2550/14* (2013.01);
(Continued)

(58) Field of Classification Search
CPC ......... B60W 30/0956; B60W 30/0953; B60W 30/09; B60W 30/165; B60W 40/02; B60W 2550/30; B60W 2550/14; B60W 2550/308; B60W 2750/30; B60W 2550/402; B60W 2550/10; B60W 2550/306; B60W 2750/308; G05D 1/0212
See application file for complete search history.

(56) References Cited

U.S. PATENT DOCUMENTS 9,043,088 B2    5/2015  Isaji et al.
2011/0137488 A1  6/2011  Sakugawa
(Continued)

FOREIGN PATENT DOCUMENTS

JP    20063166 A     1/2006
JP    2007137248 A   6/2007
(Continued)

*Primary Examiner* — Anne M Antonucci
(74) *Attorney, Agent, or Firm* — Young Basile Hanlon & MacFarlane, P.C.

(57) ABSTRACT

A course prediction method uses a position acquisition circuit configured to acquire a position of a surrounding vehicle and a course prediction circuit configured to predict a course of a host vehicle based on a traveling path of the surrounding vehicle obtained from a history of the position of the surrounding vehicle. In the course prediction method, the course of the host vehicle is predicted by increasing or reducing the size of the traveling path of the surrounding vehicle, based on a turning direction and a lateral position of the surrounding vehicle.

8 Claims, 10 Drawing Sheets (51) Int. Cl.
*B60W 30/165* (2012.01)
*B60W 40/02* (2006.01)
*G05D 1/02* (2006.01)

(52) U.S. Cl.
CPC ... *B60W 2550/30* (2013.01); *B60W 2550/306* (2013.01); *B60W 2550/308* (2013.01); *B60W 2550/402* (2013.01); *B60W 2750/30* (2013.01); *B60W 2750/308* (2013.01)

(56) References Cited

U.S. PATENT DOCUMENTS

| | | | |
|---|---|---|---|
| 2013/0304322 A1* | 11/2013 | Isaji | B62D 15/025 |
| | | | 701/41 |
| 2014/0180569 A1 | 6/2014 | Ueda et al. | |
| 2015/0088382 A1* | 3/2015 | Obuchi | B60K 31/00 |
| | | | 701/41 |
| 2016/0339919 A1* | 11/2016 | Habu | B60W 50/0097 |

FOREIGN PATENT DOCUMENTS

| | | | |
|---|---|---|---|
| JP | 2013226973 A | 11/2013 | |
| JP | 2014123283 A | 7/2014 | |
| JP | 201558920 A | 3/2015 | |
| JP | 2016027740 A | 2/2016 | |
| WO | 2010122639 A1 | 10/2010 | |

\* cited by examiner

COURSE PREDICTION METHOD AND COURSE PREDICTION DEVICE

TECHNICAL FIELD

The present invention relates to a course prediction method and a course prediction device.

BACKGROUND

There has been conventionally known a steering control technique in which a traveling path of a preceding vehicle is acquired or calculated and a curve shape of a lane on which a host vehicle is traveling (host vehicle lane) is predicted from the traveling path of the preceding vehicle (see Japanese Patent Application Publication No. 2013-226973).

However, in Japanese Patent Application Publication No. 2013-226973, it is difficult to predict the curve shape of the host vehicle lane from a traveling path of a surrounding vehicle traveling in a lane other than the host vehicle lane.

SUMMARY

The present invention has been made in view of the aforementioned problem and an object thereof is to provide a course prediction method and a course prediction device which can predict a course of a host vehicle from a traveling path of a surrounding vehicle.

In one aspect of the present invention, a course of a host vehicle is predicted by increasing or reducing the size of a traveling path of a surrounding vehicle, based on a turning direction and a lateral position of the surrounding vehicle.

According to one aspect of the present invention, since the course of the host vehicle is predicted by increasing or reducing the size of the traveling path of the surrounding vehicle, the course of the host vehicle can be predicted by using the traveling path of the surrounding vehicle traveling in a lane other than a host vehicle lane.

DETAILED DESCRIPTION

First Embodiment

Next, an embodiment is described in detail with reference to the drawings.

An overall configuration of a course prediction device 1a according to a first embodiment is described with reference to FIG. 1. The course prediction device 1a predicts a course of a host vehicle from a position of a surrounding vehicle. The "surrounding vehicle" refers to another vehicle which travels around the host vehicle in a lane (adjacent lane) adjacent to a lane (host vehicle lane) in which the host vehicle is traveling, a lane adjacent to the adjacent lane, or the like.

The course prediction device 1a includes a position detection sensor 9 which detects the position of the surrounding vehicle and a microcomputer 8 which executes a series of information computation processes to predict the course of the host vehicle from the position of the surrounding vehicle detected by the position detection sensor 9. The position detection sensor 9 and the microcomputer 8 are both mounted in the host vehicle and are connected to each other by a cable for receiving and sending the position of the surrounding vehicle.

Specific examples of the position detection sensor 9 include a radar, a laser radar, a laser range finder (LRF), and a camera but the position detection sensor 9 is not limited to these and may use other known methods. Note that means for acquiring depth information by using a camera include not only means using a stereo camera but also means using a monocular camera.

The microcomputer 8 can be implemented by using a general-purpose microcomputer including a CPU (central processing unit), a memory, and input and output units. A computer program (course prediction program) for executing the series of information computation processes for predicting the course of the host vehicle from the position of the surrounding vehicle is installed in the microcomputer 8 and the microcomputer 8 executes the computer program. The microcomputer 8 thereby functions as information computation circuits (10, 20, 30, 40) which execute the series of information computation processes. Note that, although an example in which the course prediction device 1a is implemented by software is explained in this description, the information computation circuits (10, 20, 30, 40) described below may be configured as dedicated hardware such as an ASIC, instead of the general-purpose microcomputer, as a matter of course. Alternatively, the information computation circuits (10, 20, 30, 40) which are otherwise implemented by the microcomputer 8 may be configured by individual pieces of hardware. Furthermore, the microcomputer 8 may be used also as an electronic control unit (ECU) used for other control relating to the vehicle.

The microcomputer 8 functions as a position acquisition circuit 10, a traveling path calculation circuit 20, a lateral deviation amount calculation circuit 30, and a course prediction circuit 40.

The position acquisition circuit 10 acquires the position of the surrounding vehicle. The position acquisition circuit 10 may acquire the position of the surrounding vehicle detected by the position detection sensor 9 from the position detection sensor 9. As a matter of course, the position acquisition circuit 10 may externally acquire information indicating the position of the surrounding vehicle via a radio communication network.

Figure 4:
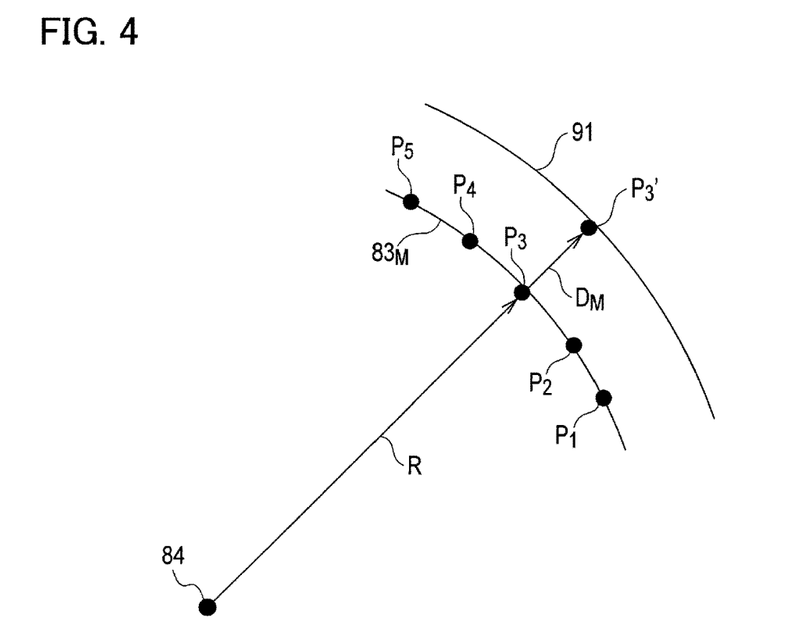
FIG. 4 is a bird's eye view which illustrates multiple path points ($P_1$, $P_2$, $P_3$, $P_4$, $P_5$, . . . ) on a map and a traveling path $83_M$ formed of an approximate curve of these points and which explains an example of a specific method of predicting the course of the host vehicle by correcting a base traveling path $83_M$.

The traveling path calculation circuit 20 calculates the traveling path of the surrounding vehicle from a history of the position of the surrounding vehicle acquired by the position acquisition circuit 10. Specifically, the traveling path calculation circuit 20 calculates the traveling path of the surrounding vehicle by connecting the positions of the surrounding vehicle detected at multiple consecutive time points. For example, as illustrated in FIG. 4, the traveling path calculation circuit 20 may repeatedly plot the position ($P_1$, $P_2$, $P_3$, $P_4$, $P_5$, . . . ) of the surrounding vehicle relative to the host vehicle which is detected every predetermined time, on a map in consideration of the moving direction and moving distance of the host vehicle within the predetermined time, and perform curve approximation for multiple positions (path points: $P_1$ to $P_5$, . . . ) plotted on the map. An approximate curve $83_M$ thus obtained forms the traveling path of the surrounding vehicle.

The lateral deviation amount calculation circuit 30 calculates the position (hereafter referred to as "lateral position") of the traveling path calculated by the traveling path calculation circuit 20, relative to the host vehicle in a vehicle width direction of the host vehicle. For example, in a two-dimensional coordinate system in which the origin is the host vehicle and a vehicle front-rear direction and the vehicle width direction are an x-axis and a y-axis, respectively, the lateral position can be indicated by an intersection between the traveling path and the y-axis, that is a y-coordinate of a y-intercept. The lateral position is described later with reference to FIG. 3.

Alternatively, the lateral deviation amount calculation circuit 30 may determine a lane in which the traveling path is located as the lateral position of the traveling path. For example, the lateral deviation amount calculation circuit 30 detects a lane marker provided on a road surface by using a camera or the like mounted in the host vehicle and calculates the position of the lane marker relative to the host vehicle. Then, the lateral deviation amount calculation circuit 30 determines the lane in which the surrounding vehicle is traveling, that is the lane (adjacent lane, lane adjacent to the adjacent lane, or the like) in which the traveling path is located, based on the position of the lane marker and the position of the traveling path. Since the width of the lane varies depending on a road section, the lateral deviation amount calculation circuit 30 may set the lateral position of the traveling path determined to be in the adjacent lane to, for example, 3 m and set the lateral position of the traveling path determined to be in the lane adjacent to the adjacent lane to, for example, 6 m, instead of an actually measured value.

The course prediction circuit 40 predicts the course of the host vehicle by increasing or reducing the size of the traveling path of the surrounding vehicle based on the turning direction of the surrounding vehicle and the lateral position calculated by the lateral deviation amount calculation circuit 30. Note that the course prediction circuit 40 determines the turning direction of the surrounding vehicle from the traveling path of the surrounding vehicle calculated by the traveling path calculation circuit 20. For example, when the traveling path has a right curve shape, the course prediction circuit 40 may determine that the turning direction is right and, when the traveling path has a left curve shape, determine that the turning direction is left.

The course prediction circuit 40 includes a base traveling path selector 40a, a base traveling path corrector 40b, and a course determiner 40c.

The base traveling path selector 40a selects a traveling path (hereafter, referred to as "base traveling path") to be used as a base in estimation of the course, from traveling paths of multiple surrounding vehicles. When the position acquisition circuit 10 acquires the positions of the multiple surrounding vehicles, multiple traveling paths and multiple lateral positions are calculated. In this case, the base traveling path selector 40a selects a traveling path suitable for the estimation of course, based on the lateral positions of the traveling paths. The selection of the base traveling path is described later with reference to FIG. 3.

The base traveling path corrector 40b corrects the base traveling path selected by the base traveling path selector 40a, based on the turning direction of the surrounding vehicle and the lateral position of the base traveling path. The correction of the base traveling path is described later with reference to FIG. 4.

The course determiner 40c sets the base traveling path corrected by the base traveling path corrector 40b as the course of the host vehicle.

Figure 3:
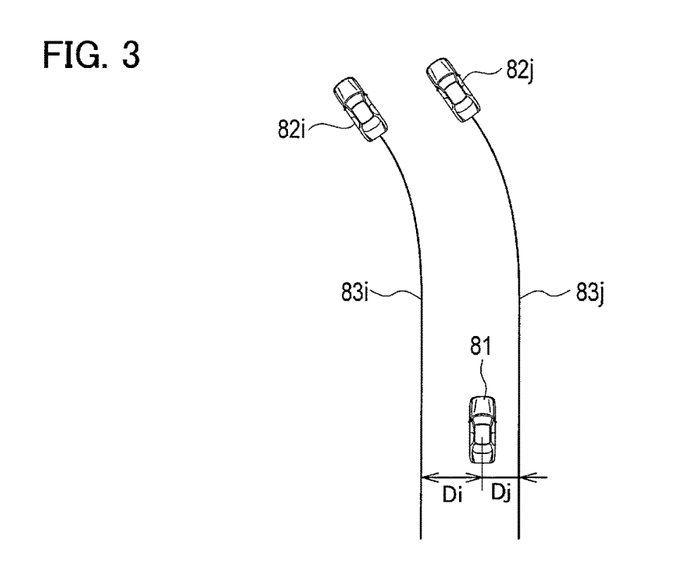
FIG. 3 is a bird's eye view of surrounding vehicles ($82i$, $82j$) and their traveling paths ($83i$, $83j$) from above a host vehicle 81.

The lateral positions (Di, Dj) of the traveling paths (83i, 83j) and a method of selecting the base traveling path are specifically described with reference to FIG. 3. In the example illustrated in FIG. 3, the position acquisition circuit 10 acquires the positions of multiple surrounding vehicles (82i, 82j) and the traveling path calculation circuit 20 calculates the traveling paths (83i, 83j) of the respective surrounding vehicles (82i, 82j). Then, the lateral deviation amount calculation circuit 30 calculates the lateral positions (Di, Dj) of the respective traveling paths (83i, 83j) relative to a host vehicle 81. Note that, since the traveling paths (83i, 83j) have left curve shapes as illustrated in FIG. 3, the course prediction circuit 40 determines that the turning directions of the surrounding vehicles are left.

The base traveling path selector 40a selects the base traveling path from the multiple traveling paths (83i, 83j), based on the lateral positions (Di, Dj) of the traveling paths. Specifically, the base traveling path selector 40a selects the traveling path (83i, 83j) of the surrounding vehicle away from the host vehicle 81 by a distance smaller than a predetermined reference distance, as the base traveling path. For example, when there are multiple surrounding vehicles, the base traveling path selector 40a selects traveling paths (83i, 83j) whose absolute values of the lateral positions (Di, Dj) are smaller than a first reference distance (3 m), from multiple traveling paths, so as to select the base traveling path from the traveling paths of the surrounding vehicles in the host vehicle lane and the adjacent lane. When the absolute values of the lateral positions (Di, Dj) of multiple traveling paths (83i, 83j) are smaller than the first reference distance (3 m), the base traveling path selector 40a selects a traveling path of the surrounding vehicle (82i, 82j) whose distance from the host vehicle 81 is smaller than a second reference distance, from the multiple traveling paths (83i, 83j). Here, the "distance of the surrounding vehicle (82i, 82j) from the host vehicle 81" is a concept including not only the distance in the vehicle width direction but also the distance in a traveling direction. For example, the base traveling path selector 40*a* selects the traveling path 83*j* of the surrounding vehicle 82*j* closest to the host vehicle 81 as the base traveling path, from the traveling paths (83*i*, 83*j*) whose the absolute values of the lateral positions (Di, Dj) are smaller than the first reference distance (3 m).

Alternatively, the base traveling path selector 40*a* may select the traveling path 83*j* whose absolute value of the lateral position (Di, Dj) is the smallest, as the base traveling path. In this case, the base traveling path selector 40*a* does not consider the "distance of the surrounding vehicle (82*i*, 82*j*) from the host vehicle 81." As another alternative, the base traveling path selector 40*a* may select the traveling path of "the surrounding vehicle (82*i*, 82*j*) whose distance from the host vehicle 81" is the smallest, as the base traveling path. In this case, the base traveling path selector 40*a* does not consider the "absolute values of the lateral positions (Di, Dj)."

Note that, when the lane (adjacent lane, lane adjacent to the adjacent lane, or the like) in which each traveling path is located is used as the lateral position of the traveling path, for example, the base traveling path selector 40*a* selects the traveling path located in the adjacent lane and does not select the traveling path located in the lane adjacent to the adjacent lane.

An example of a specific method of predicting the course of the host vehicle 81 by correcting a base traveling path $83_M$ is described with reference to FIG. 4. The base traveling path corrector 40*b* increases or reduces the size of the base traveling path $83_M$ selected by the base traveling path selector 40*a*, based on the turning direction of the surrounding vehicle and the lateral position $D_M$ of the base traveling path $83_M$.

First, the base traveling path corrector 40*b* calculates a turning radius R and a turning center 84 at each of path points ($P_1$ to $P_5$, . . . ). For example, the base traveling path corrector 40*b* calculates the turning radius R and the coordinates of the turning center 84 by using the path point $P_3$ being the calculation target and the points preceding and following the path point $P_3$ by means of a least squares method or the like. The base traveling path corrector 40*b* calculates the turning radius R and the turning center 84 for each of the path points ($P_1$ to $P_5$, . . . ) in a similar way.

Next, the base traveling path corrector 40*b* increases the turning radius R about the turning center 84 at each path points ($P_1$ to $P_5$, . . . ) to a turning radius ($R+D_M$) or reduces the turning radius R to a turning radius ($R-D_M$). The base traveling path corrector 40*b* determines whether to increase or reduce the turning radius R, based on the turning direction and the lateral position $D_M$ of the base traveling path $83_M$.

For example, as in the traveling path 83*i* of FIG. 3, when the turning direction is left and the lateral position Di of the traveling path 83*i* is on the left side of the host vehicle 81, the host vehicle 81 is located outside the traveling path 83*i* of the surrounding vehicle 82*i* in the turning direction. In this case, as in FIG. 4, the turning radius at each path point ($P_1$ to $P_5$, . . . ) of the traveling path 83*i* is increased to a turning radius (R+Di).

Meanwhile, as in the traveling path 83*j* of FIG. 3, when turning direction is left and the lateral position Dj of the traveling path 83*j* is on the right side of the host vehicle 81, the host vehicle 81 is located inside the traveling path 83*j* of the surrounding vehicle 82*j* in the turning direction. In this case, contrary to FIG. 4, the turning radius at each path point ($P_1$ to $P_5$, . . . ) of the traveling path 83*j* is reduced to a turning radius (R−Dj).

As described above, the base traveling path corrector 40*b* changes the distance (turning radius) from the turning center 84 to each path point ($P_1$ to $P_5$, . . . ) without changing the turning center 84. When the host vehicle 81 is located outside the traveling path in the turning direction, the base traveling path corrector 40*b* increases the turning radius and, when the host vehicle 81 is located inside the traveling path, reduces the turning radius. Then, the base traveling path corrector 40*b* performs the curve approximation again on the path points ($P_3$') subjected to the turning radius increase or reduction and can thereby correct the base traveling path $83_M$.

The larger the turning radius R of the base traveling path $83_M$ is, the smaller the degree of increasing or reducing by the base traveling path corrector 40*b* is made. In other words, provided that the lateral position D is constant, the larger the turning radius R is, the smaller the increase ratio ($=(R+D_M)/R$) and the reduction ratio ($=(R-D_M)/R$) are.

The greater the distance from the host vehicle 81 to the lateral position $D_M$ of the surrounding vehicle 82 is, the greater the degree of increasing or reducing by the base traveling path corrector 40*b* is made. In other words, provided that the turning radius R is constant, the larger the absolute value of the lateral position $D_M$ is, the larger the increase ratio and the reduction ratio are.

In the first embodiment, the course determiner 40*c* determines a base traveling path 91 corrected by the base traveling path corrector 40*b* as the course of the host vehicle as it is.

Figure 1:
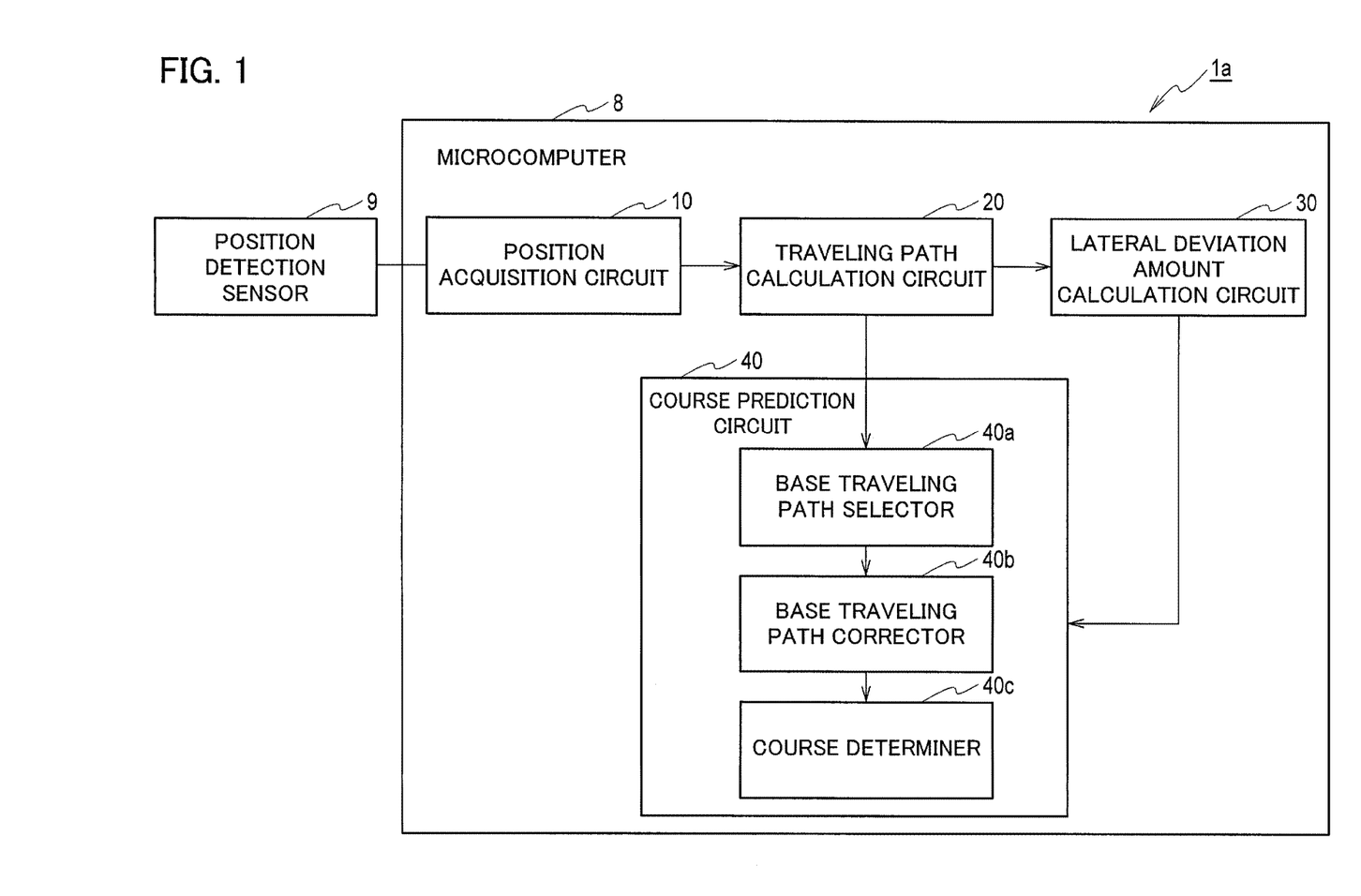
FIG. 1 is a block diagram illustrating an overall configuration of a course prediction device 1a according to a first embodiment.
Figure 2:
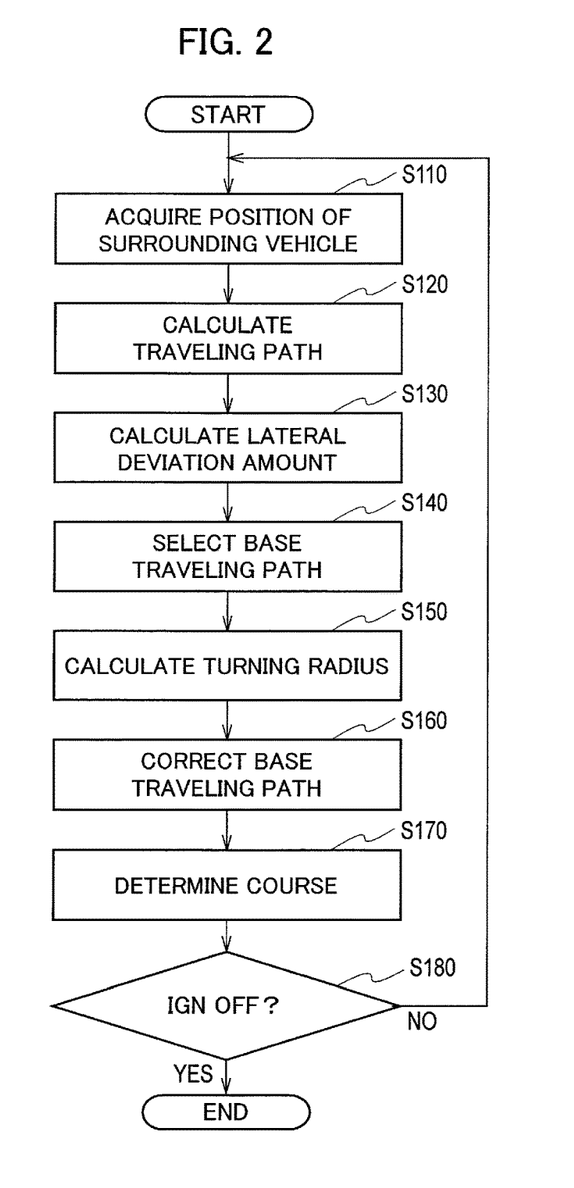
FIG. 2 is a flowchart explaining an example of a course prediction method using the course prediction device 1a illustrated in FIG. 1.

An example of a course prediction method using the course prediction device 1*a* illustrated in FIG. 1 is described with reference to the flowchart of FIG. 2. Here, operation steps of the microcomputer 8 in the course prediction device 1*a* illustrated in FIG. 1 are described. The processing illustrated in FIG. 2 is repeatedly executed at a predetermined cycle.

First, in step S110, the position acquisition circuit 10 acquires the position of each surrounding vehicle.

Proceeding to step S120, as illustrated in FIG. 4, the traveling path calculation circuit 20 calculates the traveling path (approximate curve $83_M$) of each surrounding vehicle from the history (traveling points: $P_1$ to $P_5$, . . . ) of the position of the surrounding vehicle acquired by the position acquisition circuit 10.

Proceeding to step S130, as illustrated in FIG. 3, the lateral deviation amount calculation circuit 30 calculates the lateral position (Di, Dj) of each traveling path (83*i*, 83*j*) calculated by the traveling path calculation circuit 20 relative to the host vehicle 81.

Proceeding to step S140, as illustrated in FIG. 3, the base traveling path selector 40*a* selects the base traveling path from the multiple traveling paths (83*i*, 83*j*), based on the lateral positions (Di, Dj) of the traveling paths. For example, the base traveling path selector 40*a* selects the traveling paths (83*i*, 83*j*) whose absolute values of the lateral positions (Di, Dj) are smaller than the first reference distance (3 m) and selects the traveling path 83*j* of the surrounding vehicle 82*j* closest to the host vehicle 81, as the base traveling path $83_M$. However, the method of selecting the base traveling path is not limited to this and the other methods described above may be used. Note that the selection of the base traveling path may be performed only when the positions of multiple surrounding vehicles are acquired in step S110. When the position of only one surrounding vehicle is acquired, the base traveling path selector 40*a* may select the traveling path of this surrounding vehicle as the base traveling path. Moreover, when there is no traveling path whose absolute value of the lateral position is smaller than the first reference distance, the processing may be aborted and restarted from step S110 or the traveling path whose absolute value of the lateral position is the smallest may be selected as the base traveling path.

Proceeding to step S150, as illustrated in FIG. 4, the base traveling path corrector 40b calculates the turning radius R and the turning center 84 at each path point ($P_1$ to $P_5$, ...).

Proceeding to step S160, as illustrated in FIG. 4, the base traveling path corrector 40b increases the turning radius R about the turning center 84 at each path point ($P_1$ to $P_5$, ...) to the turning radius ($R+D_M$) or reduces the turning radius R to the turning radius ($R-D_M$). The base traveling path corrector 40b determines whether to increase or reduce the turning radius R, based on the turning direction and the lateral position of the base traveling path $83_M$. Then, the base traveling path corrector 40b performs the curve approximation again on the path points ($P_3'$) subjected to the turning radius increase or reduction and thereby corrects the base traveling path $83_M$.

Proceeding to step S170, the course determiner 40c determines the base traveling path 91 corrected by the base traveling path corrector 40b as the course of the host vehicle as it is.

Proceeding to step S180, the microcomputer 8 determines whether an ignition switch of the host vehicle 81 is turned off and repeatedly executes steps S110 to S170 described above at a predetermined cycle until the ignition switch is turned off. When the ignition switch is turned off (YES in step S180), the aforementioned processing cycle is terminated.

As described above, in the first embodiment, the following operations and effects are obtained.

Figure 5A:
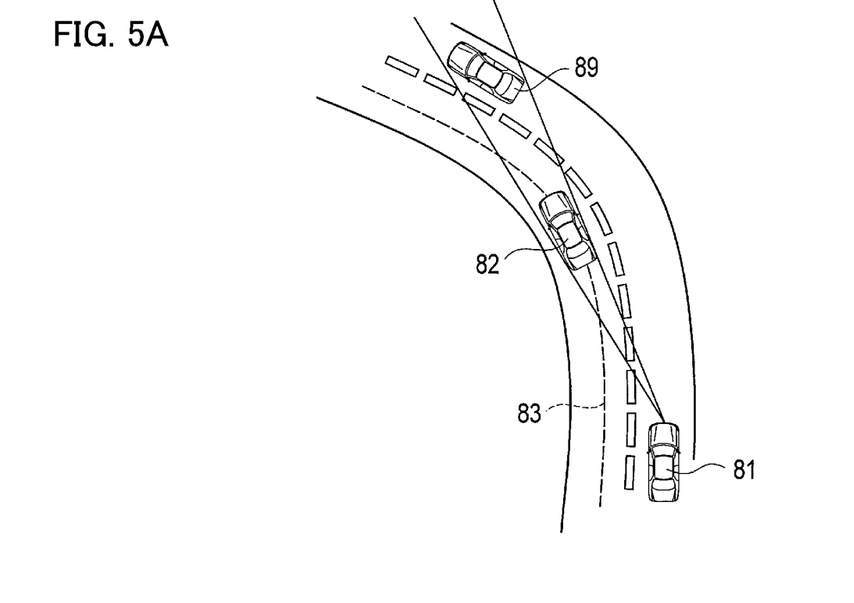
FIG. 5A is a bird's eye view illustrating a situation where the host vehicle 81 cannot detect the position of a preceding vehicle 89 due to a surrounding vehicle 82.
Figure 5B:
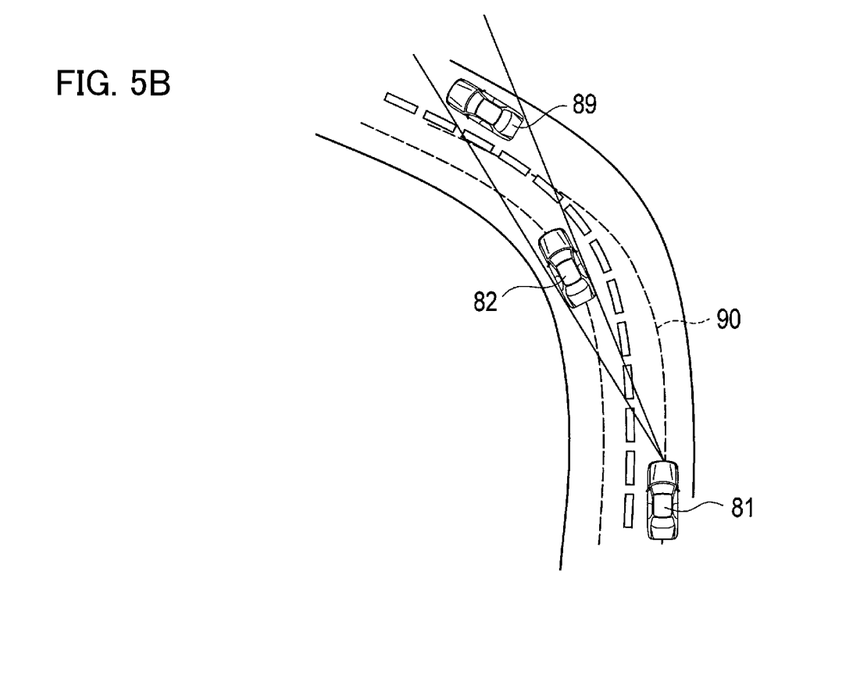
FIG. 5B is a bird's eye view illustrating a state where a curve shape 90 of the host vehicle lane cannot be appropriately predicted.

The microcomputer 8 predicts the course of the host vehicle 81 by increasing or reducing the size of the traveling path (83i, 83j) of the surrounding vehicle (82i, 82j). The microcomputer 8 can thereby predict the course of the host vehicle 81 by using the traveling path (83i, 83j) of the surrounding vehicle (82i, 82j) traveling in the lane other than the host vehicle lane. For example, as illustrated in FIG. 5A, assume a situation where the host vehicle 81 cannot detect the position of a preceding vehicle 89 due to the surrounding vehicle 82 or the like. A curve shape of a traveling path (adjacent lane) of the surrounding vehicle 82 is different from a curve shape of a traveling path (host vehicle lane) of the preceding vehicle 89. Accordingly, when a conventional method of predicting the course of the host vehicle 81 from the traveling path of the preceding vehicle 89 is applied, as illustrated in FIG. 5B, a curve shape 90 of the host vehicle lane cannot be appropriately predicted. In the first embodiment, also in the situation illustrated in FIG. 5A, the microcomputer 8 can accurately predict the curve shape of the host vehicle 81 by using the traveling path 83 of the surrounding vehicle 82 traveling in the adjacent lane or the like.

As illustrated in FIG. 4, the larger the turning radius of the traveling path $83_M$ is, the smaller the degree of increasing or reducing by the base traveling path corrector 40b is made. The base traveling path corrector 40b can thereby appropriately predict the course depending on the curve shape.

As illustrated in FIG. 4, the greater the distance from the host vehicle 81 to the lateral position $D_M$ of the surrounding vehicle 82 is, the greater the degree of increasing or reducing by the base traveling path corrector 40b is made. The base traveling path corrector 40b can thereby appropriately predict the course also when the lane in which the host vehicle 81 is traveling is different from the lane in which the surrounding vehicle 82 is traveling (the adjacent lane or the lane adjacent to the adjacent lane).

The microcomputer 8 predicts the course based on the traveling path (83i, 83j) of the surrounding vehicle whose distance from the host vehicle 81 is the smallest. The closer the position of the surrounding vehicle (82i, 82j) to the host vehicle 81 is, the higher the detection accuracy of this position is. Accordingly, the microcomputer 8 predicts the course based on the traveling path (83i, 83j) of the surrounding vehicle (82i, 82j) whose distance from the host vehicle 81 is the smallest, and can thereby appropriately predict the course from the highly-accurate traveling path (83i, 83j).

Moreover, the microcomputer 8 predicts the course based on the traveling path 83j of the surrounding vehicle in the lane adjacent to the lane in which the host vehicle 81 is traveling. The microcomputer 8 can thereby appropriately predict the course from the highly-accurate traveling path 83j.

Second Embodiment

An overall configuration of a course prediction device 1b according to a second embodiment is described with reference to FIG. 6. The course prediction device 1b acquires map information including at least branching information of roads and does not predict the course of the host vehicle when determining that the host vehicle 81 is to pass a branching point. When the course prediction device 1b determines that the host vehicle 81 is to pass no branching point, the course determiner 40c determines the base traveling path 91 corrected by the base traveling path corrector 40b as the course of the host vehicle.

Figure 6:
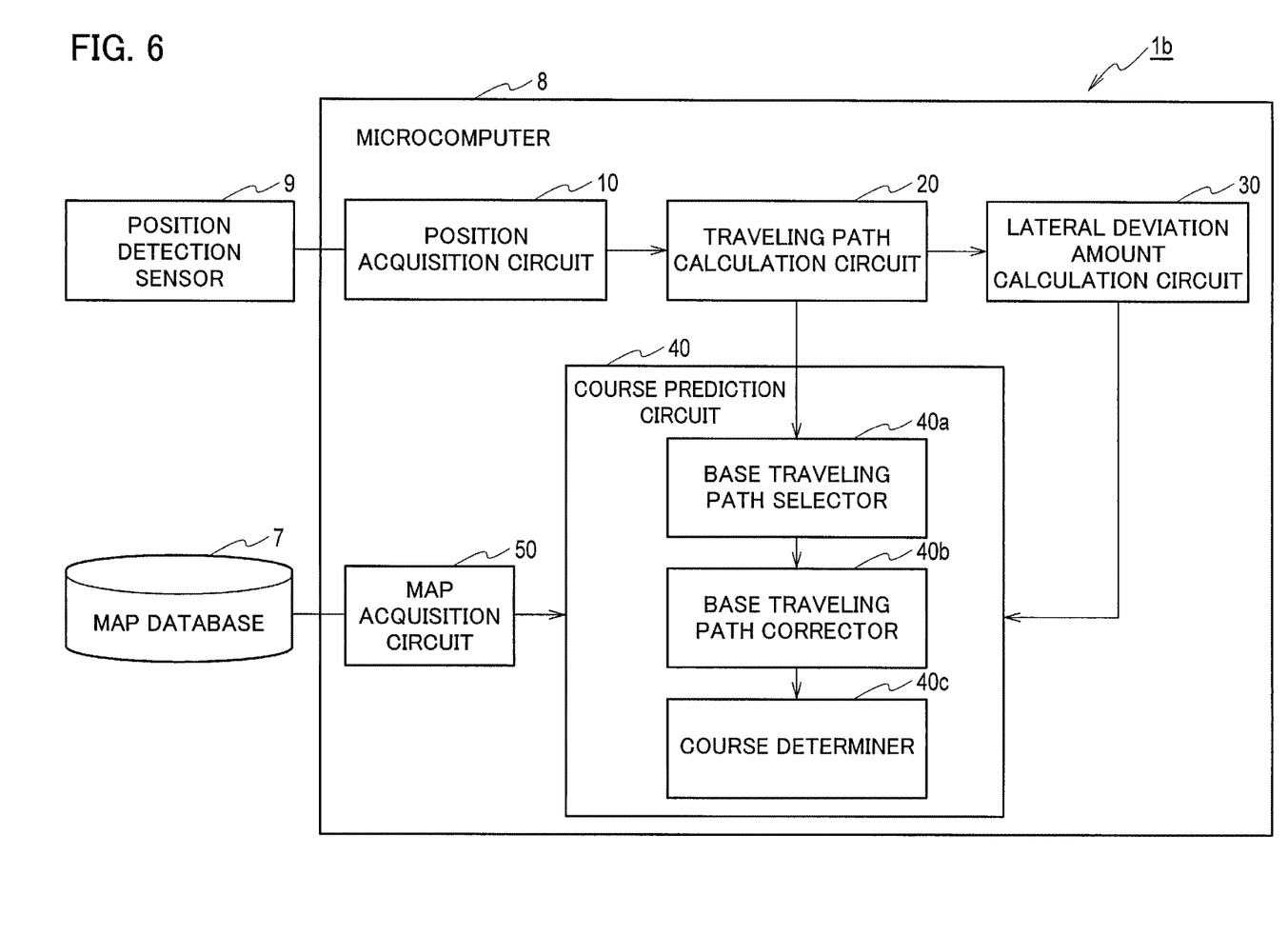
FIG. 6 is a block diagram illustrating an overall configuration of a course prediction device 1b according to a second embodiment.

As illustrated in FIG. 6, the course prediction device 1b further includes a map database 7. The map database 7 and the microcomputer 8 are both mounted in the host vehicle 81 and are connected each other by a cable for receiving and sending the map information including at least the branching information of roads.

The microcomputer 8 functions not only as the information computation circuits (10, 20, 30, 40) but also as a map acquisition circuit 50. The map acquisition circuit 50 acquires the map information including at least the branching information of roads, from the map database 7.

The other configurations of the course prediction device 1b are the same as those of the course prediction device 1a in FIG. 1 and description thereof is omitted.

An example of a course prediction method using the course prediction device 1b illustrated in FIG. 6 is described with reference to the flowchart of FIG. 7. Here, operation steps of the microcomputer 8 in the course prediction device 1b illustrated in FIG. 6 are described. The processing illustrated in FIG. 7 is repeatedly executed at a predetermined cycle.

Figure 7:
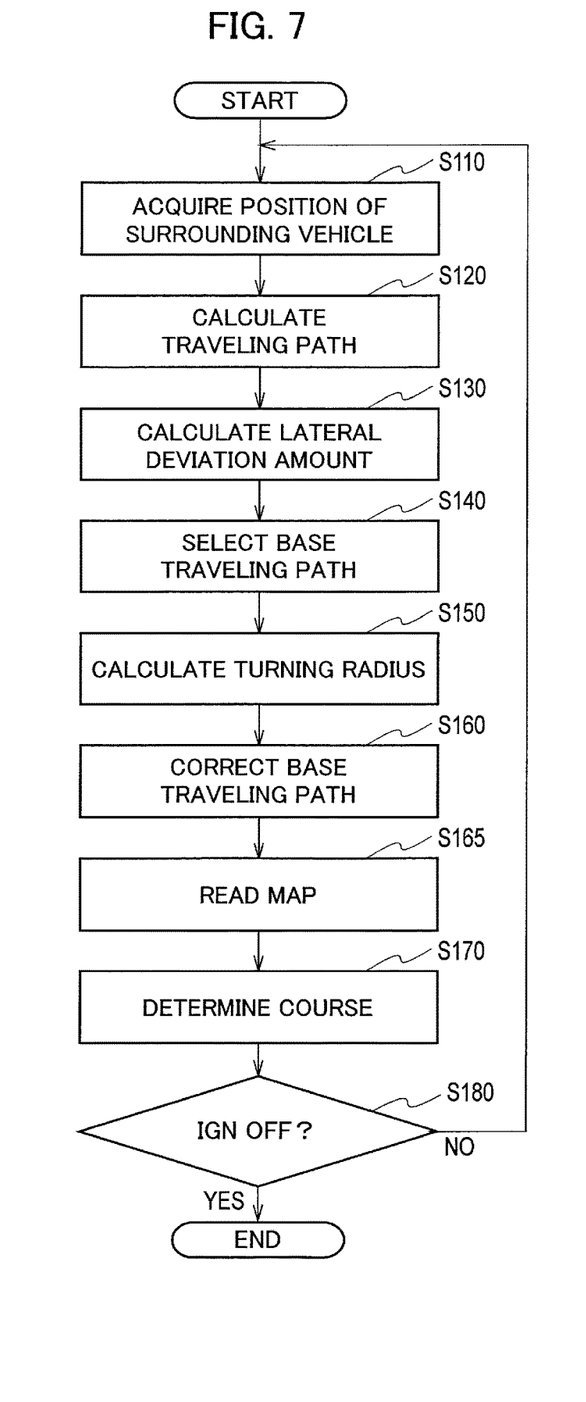
FIG. 7 is a flowchart illustrating an example of a course prediction method using the course prediction device 1b illustrated in FIG. 6.

In comparison with FIG. 2, the flowchart of FIG. 7 further includes step S165 and is different in the contents of step S170. The contents of processing in steps S110 to S160 and S180 in FIG. 7 are the same as those in FIG. 2 and description thereof is omitted.

After step S160, the processing proceeds to step S165 and the map acquisition circuit 50 acquires the map information including at least the branching information of roads, from the map database 7. Specifically, the map acquisition circuit 50 reads the map information including the branching information of a road on which the host vehicle 81 is traveling, from the map database 7.

Figure 8:
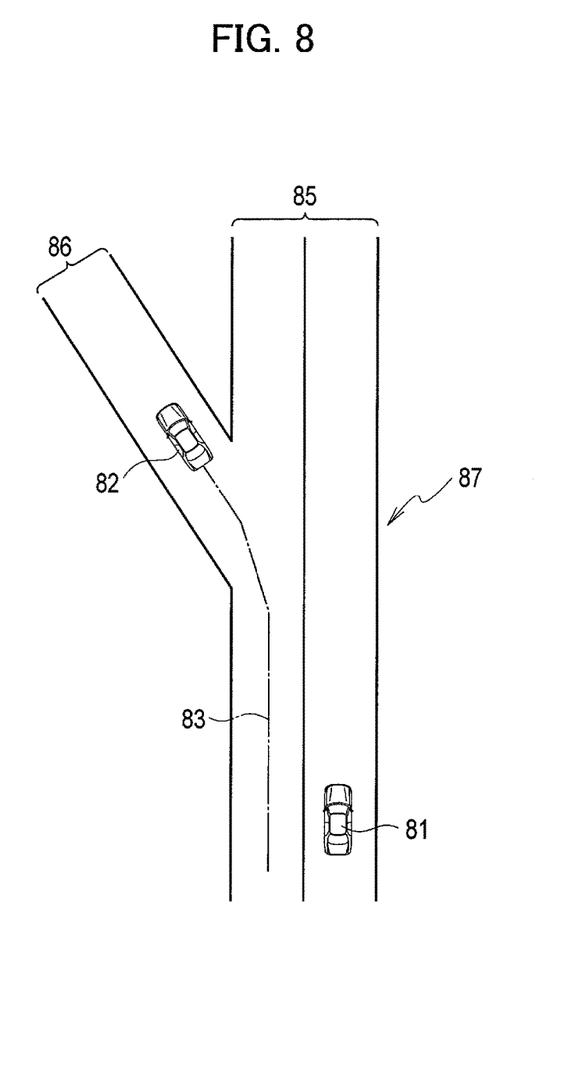
FIG. 8 is a bird's eye view illustrating a case where the host vehicle 81 is determined to pass a branching point 87 within a predetermined time.

Proceeding to step S170, the course determiner 40c predicts the course of the host vehicle from the corrected base traveling path 91, the map information, and the absolute value of the lateral position $D_M$. The course determiner 40c determines whether the host vehicle 81 is to pass a branching point within a predetermined time. Specifically, as illustrated in FIG. 8, the course determiner 40c determines whether a road on which the host vehicle 81 is traveling includes a point (branching point 87) where the road branches into two or more roads (85, 86) in front of the host vehicle 81 within a predetermined distance therefrom. When the course determiner 40c determines that the absolute value of the lateral position $D_M$ of the base traveling path $83_M$ is a third reference distance (1.5 m) or more and that the host vehicle 81 is to pass the branching point 87 within the predetermined time, the course determiner 40c does not predict the course of the host vehicle 81. Specifically, when the course determiner 40c determines that the surrounding vehicle for which the traveling path can be calculated is traveling in a lane other than the host vehicle lane (the distance to the lateral position $D_M$ is the third reference distance (1.5 m) or more) and that the host vehicle 81 is to pass the branching point 87, the course determiner 40c does not set the base traveling path 91 corrected by the base traveling path corrector 40b as the course of the host vehicle 81. Meanwhile, when the course determiner 40c determines that the absolute value of the lateral position $D_M$ of the base traveling path $83_M$ is less than the third reference distance (1.5 m) or that the host vehicle 81 is to pass no branching point 87 within the predetermined time, the course determiner 40c sets the base traveling path 91 corrected by the base traveling path corrector 40b as the course of the host vehicle 81. Specifically, when the course determiner 40c determines that the surrounding vehicle for which the traveling path can be calculated is traveling in the host vehicle lane (the distance to the lateral position $D_M$ is less than the third reference distance (1.5 m)) or that the host vehicle 81 is to pass no branching point, the course determiner 40c sets the base traveling path 91 corrected by the base traveling path corrector 40b as the course of the host vehicle 81.

As described above, in the second embodiment, the course is not predicted when the host vehicle 81 is to pass the branching point 87. Accordingly, as illustrated in FIG. 8, erroneous course prediction can be prevented when the surrounding vehicle 82 leaves in a direction (road 86) different from the course (road 85) of the host vehicle 81 at the branching point 87. Specifically, when the traveling path 83 of the surrounding vehicle and the course of the host vehicle are to be located in different roads (85, 86) from the branching point 87, the course determiner 40c prevents the corrected base traveling path 91 from being set as the course of the host vehicle 81. Erroneous course prediction can be thereby avoided.

Note that, in step S170, the course determiner 40c may determine the course based only on the presence or absence of the branching point 87. For example, no matter where the position of the lane of the surrounding vehicle for which the traveling path can be calculated is, the course determiner 40c may not predict the course of the host vehicle 81 irrespective of the lateral position $D_M$ of the base traveling path $83_M$ when determining that the host vehicle 81 is to pass the branching point 87 within the predetermined time.

Third Embodiment

An overall configuration of a course prediction device 1c according to a third embodiment is described with reference to FIG. 9. The course prediction device 1c acquires at least travel route information of the host vehicle 81 on a map and predicts the course based on the traveling path 83 of the surrounding vehicle 82 similar to a travel route of the host vehicle 81. The course determiner 40c determines the base traveling path 91 corrected by the base traveling path corrector 40b as the course of the host vehicle only when the corrected base traveling path 91 is determined to be similar to the travel route of the host vehicle 81.

Figure 9:
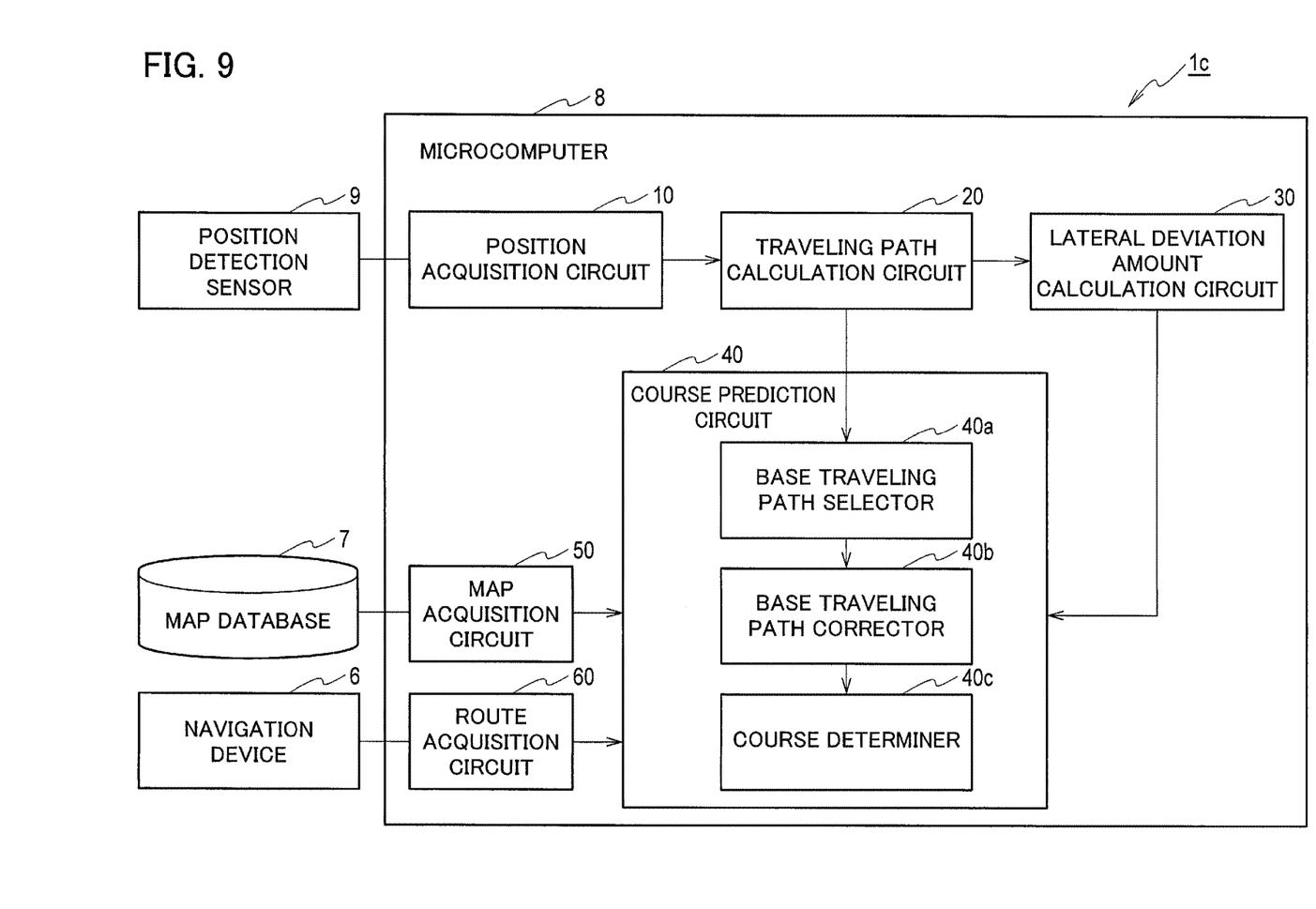
FIG. 9 is a block diagram illustrating an overall configuration of a course prediction device 1c according to a third embodiment.

As illustrated in FIG. 9, the course prediction device 1c further includes a navigation device 6. The navigation device 6, the map database 7, and the microcomputer 8 are all mounted in the host vehicle 81. The navigation device 6 and the microcomputer 8 are connected to each other by a cable for receiving and sending the traveling route information of the host vehicle 81.

The microcomputer 8 functions not only as the information computation circuits (10, 20, 30, 40, 50) but also as a route acquisition circuit 60. The route acquisition circuit 60 acquires the travel route information of the host vehicle 81 from the navigation device 6. Moreover, the map acquisition circuit 50 acquires map information including the branching information of roads, intersection information, and shape information (including turning radius information) of roads.

The other configurations of the course prediction device 1c are the same as those of the course prediction device 1b in FIG. 6 and description thereof is omitted.

An example of a course prediction method using the course prediction device 1c illustrated in FIG. 9 is described with reference to the flowchart of FIG. 10. Here, operation steps of the microcomputer 8 in the course prediction device 1c illustrated in FIG. 9 are described. The processing illustrated in FIG. 10 is repeatedly executed at a predetermined cycle.

Figure 10:
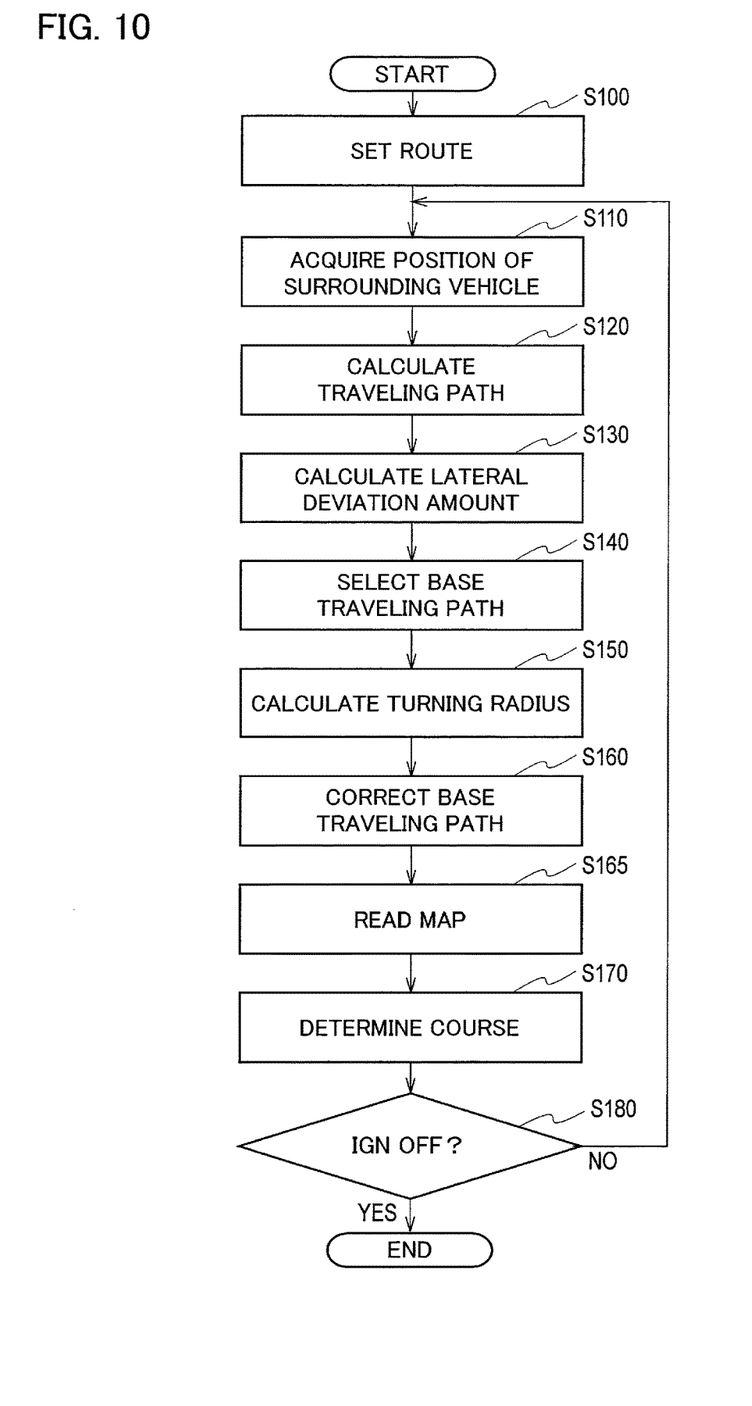
FIG. 10 is a flowchart illustrating an example of a course prediction method using the course prediction device 1c illustrated in FIG. 9.

In comparison with FIG. 7, the flowchart of FIG. 10 further includes step S100 and is different in the contents of step S170. The contents of processing in steps S110 to S160 and S180 in FIG. 10 are the same as those in FIG. 7 and description thereof is omitted.

In step S100, the route acquisition circuit 60 acquires the travel route information of the host vehicle 81 from the navigation device 6. Then, the processing proceeds to step S110.

In step S170, when the course determiner 40c determines that the absolute value of the lateral position $D_M$ of the base traveling path $83_M$ is the third reference distance or more and that the host vehicle 81 is to pass the branching point 87, the course determiner 40c does not set the corrected base traveling path 91 as the course of the host vehicle 81. This is the same as the second embodiment.

Figure 11:
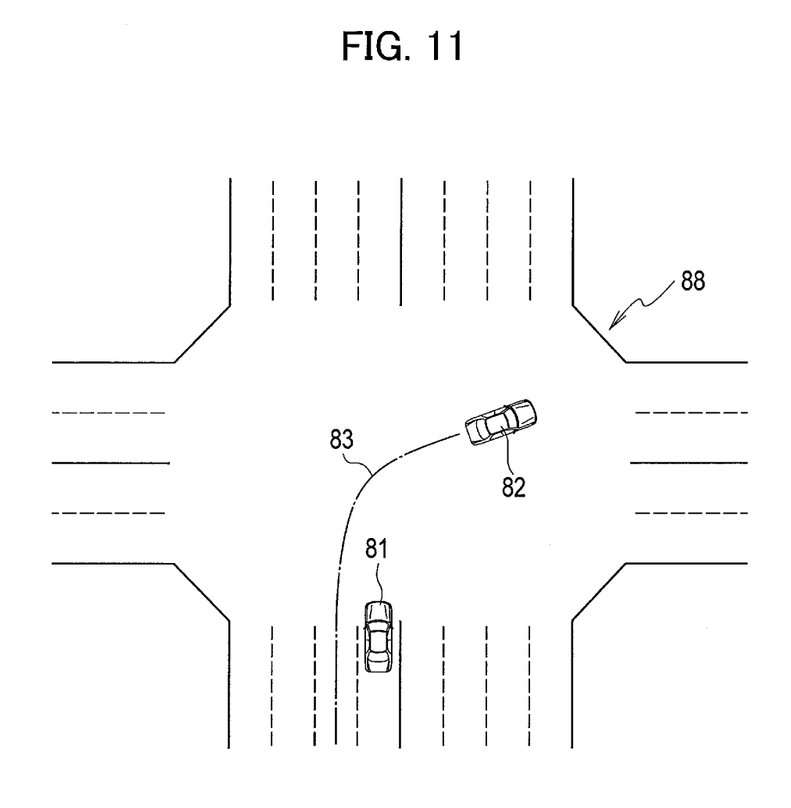
FIG. 11 is a bird's eye view illustrating a case where the host vehicle 81 is determined to pass an intersection 88 within a predetermined time.

In the third embodiment, in step S170, the course determiner 40c further determines whether the branching point 87 is an intersection 88. Then, when the branching point 87 is the intersection 88, the course determiner 40c determines whether the base traveling path 91 corrected in the step S160 is similar to the travel route of the host vehicle 81 acquired in step S100.

Then, when the course determiner 40c determines that the branching point 87 is the intersection 88 and that the corrected base traveling path 91 is similar to the travel route of the host vehicle 81, the course determiner 40c sets the base traveling path 91 corrected in step S160 as the course of the host vehicle 81.

Note that, even if the course determiner 40c determines that the branching point 87 is the intersection 88 and that the corrected base traveling path 91 is similar to the travel route of the host vehicle 81, the course determiner 40c may not set the corrected base traveling path 91 as the course of the host vehicle 81 when the following condition is established.

Specifically, the course determiner 40c may not set the corrected base traveling path 91 as the course of the host vehicle lane when a state where the absolute value of the lateral position $D_M$ of the base traveling path $83_M$ is the third reference distance (1.5 m) or more continues for a predetermined time (for example, 5 seconds) or more.

As described above, in the third embodiment, since the traveling path of the surrounding vehicle similar to the traveling route of the host vehicle 81 is used, the course can be appropriately predicted by using the traveling path of the surrounding vehicle which runs parallel to the traveling route of the host vehicle 81.

Although the third embodiment is described as an example based on the second embodiment, the third embodiment may be carried out based on the first embodiment. Specifically, in step S170, the course determiner 40c determines whether the base traveling path 91 corrected in step S160 is similar to the traveling route of the host vehicle 81 acquired in step S100. When the base traveling path 91 is not similar, the course determiner 40c does not set the base traveling path 91 corrected by the base traveling path corrector 40b as the course of the host vehicle. Meanwhile, when the base traveling path 91 is similar, the course determiner 40c sets the base traveling path 91 corrected by the base traveling path corrector 40b as the course of the host vehicle.

In step S170, the course determiner 40c does not determine whether the absolute value of the lateral position $D_M$ is the third reference distance or more, whether the host vehicle 81 passes the branching point 87, or whether the branching point 87 is the intersection 88. Step S165 (reading of the map) is also unnecessary.

Note that the course prediction device (1a, 1b, 1c) may include no position detection sensor 9. In this case, for example, the course prediction device (1a to 1c) includes a radio communication unit and the position acquisition circuit 10 can externally acquire information indicating the position of the surrounding vehicle via a radio communication network. Similarly, the course prediction device (1a to 1c) may include neither map database 7 nor navigation device 6. In this case, for example, the map acquisition circuit 50 and the route acquisition circuit 60 may externally acquire the map information and the travel route information via a computer network.

Furthermore, the course prediction device (1a to 1c) may not be mounted in the host vehicle 81. For example, the course prediction device (1a to 1c) may be a backend (cloud itself) in a cloud computing model. The host vehicle 81 being a frontend is connected to the course prediction device (1a to 1c) being the backend via a network such as the Internet. The course prediction device (1a to 1c) may predict the course of the host vehicle 81 by acquiring the information indicating the position of the surrounding vehicle 82 from the surrounding vehicle 82 itself or from the host vehicle 81 (the detection result of the position detection sensor 9) to predict the course of the host vehicle 81 and provide the predicted course to the host vehicle 81 via the network.

The functions described in the aforementioned embodiments can be implemented by one or multiple processing circuits. The processing circuit includes a programed processing device such as a processing device including an electric circuit. Moreover, the processing device includes devices such as an application-specific integrated circuit (ASIC) and conventional circuit parts which are designed to execute the functions described in the embodiments.

Although the contents of the present invention have been explained above according to the examples, the present invention is not limited to this explanation. It is apparent to those skilled in the art that various changes and modifications can be made.

REFERENCE SIGNS LIST 1a, 1b, 1c course prediction device
10 position acquisition circuit
40 course prediction circuit
81 host vehicle
82, 82i, 82j surrounding vehicle
83, 83i, 83j, $83_M$ traveling path
87 branching point
Di, Dj, $D_M$ lateral position
$P_1$ to $P_5$ position of surrounding vehicle
R turning radius

The invention claimed is:

1. A course prediction method setting a traveling path of a host vehicle based on a traveling path of a surrounding vehicle obtained from a history of the position of the surrounding vehicle by using a position acquisition circuit configured to acquire the position of the surrounding vehicle, the method comprising:
   acquiring a traveling route of the host vehicle on at least a map; and
   setting the traveling path of the host vehicle by increasing or reducing a size of the traveling path of the surrounding vehicle similar to the traveling route, based on a turning direction and a lateral position of the surrounding vehicle.

2. The course prediction method according to claim 1, wherein
   the larger a turning radius of the traveling path of the surrounding vehicle is, the smaller a degree of the increasing or reducing is made.

3. The course prediction method according to claim 1, wherein
   the greater a distance from the host vehicle to a lateral position of the surrounding vehicle is, the greater a degree of the increasing or reducing the size is made.

4. The course prediction method according to claim 1, wherein
   the traveling path of the host vehicle is set based on the traveling path of the surrounding vehicle whose distance from the host vehicle is the smallest.

5. The course prediction method according to claim 1, wherein
   the traveling path of the host vehicle is set based on the traveling path of the surrounding vehicle in a lane adjacent to a lane in which the host vehicle is traveling.

6. A course prediction method setting a traveling path of a host vehicle based on a traveling path of a surrounding vehicle obtained from a history of the position of the surrounding vehicle by using a position acquisition circuit configured to acquire the position of the surrounding vehicle, the method comprising:
   setting the traveling path of the host vehicle by increasing or reducing a size of the traveling path of the surrounding vehicle, based on a turning direction and a lateral position of the surrounding vehicle;
   acquiring map information including at least branching information of a road; and
   aborting the set of the traveling path of the host vehicle when determining that the host vehicle is to pass a branching point.

7. A course prediction device comprising:
a position acquisition circuit configured to acquire a position of a surrounding vehicle;
a course prediction circuit configured to set a traveling path of a host vehicle based on a traveling path of the surrounding vehicle obtained from a history of the position of the surrounding vehicle; and
a route acquisition circuit configured to acquire a traveling route of the host vehicle on at least a map, wherein
the course prediction circuit sets the traveling path of the host vehicle by increasing or reducing a size of the traveling path of the surrounding vehicle similar to the traveling route, based on a turning direction and a lateral position of the surrounding vehicle.

8. A course prediction device comprising:
a position acquisition circuit configured to acquire a position of a surrounding vehicle;
a course prediction circuit configured to set a traveling path of a host vehicle based on a traveling path of the surrounding vehicle obtained from a history of the position of the surrounding vehicle; and
a map acquisition circuit configured to acquire map information including at least branching information of a road, wherein
the course prediction circuit
sets the traveling path of the host vehicle by increasing or reducing a size of the traveling path of the surrounding vehicle, based on a turning direction and a lateral position of the surrounding vehicle, and
abort the set of the traveling path of the host vehicle when determining that the host vehicle is to pass a branching point.

* * * * *